United States Patent

Dietz

[11] 4,041,641
[45] Aug. 16, 1977

[54] PROCESS OF GROWING PLANTS WITHIN AN ENCLOSURE

[76] Inventor: Albert Louis Dietz, P.O. Box 5305, Santa Fe, N. Mex. 87501

[21] Appl. No.: 583,854

[22] Filed: Aug. 8, 1975

[51] Int. Cl.² .............................................. A01G 9/00
[52] U.S. Cl. .......................................... 47/17; 47/65; 47/81; 47/39
[58] Field of Search ................ 47/17, 1.2, 39, 58, 47/34.13, 38.1

[56] References Cited

U.S. PATENT DOCUMENTS

| | | | |
|---|---|---|---|
| 2,531,562 | 11/1950 | Eve | 47/34.13 |
| 2,807,912 | 10/1957 | Bjorksten | 47/38.1 X |
| 3,298,133 | 1/1967 | Courtright | 47/1.2 |
| 3,455,055 | 7/1969 | Chute | 47/38.1 |
| 3,456,385 | 7/1969 | Plath | 47/1.2 |
| 3,576,088 | 4/1971 | Arca | 47/38.1 |
| 3,579,907 | 5/1971 | Graves | 47/17 |
| 3,798,836 | 3/1974 | Rubens et al. | 47/1.2 |
| 3,830,013 | 8/1974 | Lesley | 47/1.2 |
| 3,898,766 | 8/1975 | Goldstaub | 47/38.1 |
| 3,927,491 | 12/1975 | Farnsworth | 47/1.2 |

Primary Examiner—Robert E. Bagwill

[57] ABSTRACT

A process for growing plants within a solar-heated enclosure through the use of a pool of water upon which containers are floated and moved beneath a light source. The pool of water provides support for the plants, facilitates their movement, and provides thermal mass for storage of solar heat.

4 Claims, 4 Drawing Figures

PROCESS OF GROWING PLANTS WITHIN AN ENCLOSURE

BACKGROUND OF THE INVENTION

Traditional greenhouses involve the construction of a transparent or translucent enclosure, which houses stationary plants. In order for growth to occur, sufficient light must enter a substantial portion of the top and sides of the enclosure. This results in high summer heat gain and corresponding winter heat loss.

Conventional construction facilitates solar heat gain during cold weather, but this advantage is largely lost because there is little capacity for thermal storage.

Walkways and work areas must be constructed within the enclosure in order to water and cultivate the stationary plants.

SUMMARY OF THE INVENTION

The base of a greenhouse incorporating this process is a pool of water. The depth of the pool must be sufficient to allow containers housing plants to float and move. Its actual depth will depend upon the amount of thermal storage required in order to sustain the unit during extended cold, cloudy periods. This will depend, in turn, upon solar insolation and winter temperatures at the location.

The concept of floating plants upon a pool of water and moving them beneath a light source offers several basic advantages over conventional greenhouse construction.

The most important advantage is that it permits absolute self sufficiency. This condition results from the conbination of several factors.

First, the enclosure housing such a system needs far less "window area" than a conventional greenhouse, which must be designed to expose stationary plants to light. Thus, heat loss and heat gain are dramatically reduced. Second, a solar heating system may be used because the mass of water upon which the plants are floating provides much greater capacity for heat retention than is required. Heat exchange takes place naturally and uniformally. Wind energy may be utilized to move the plants and the moisture they require may be provided by the water upon which they float and the use of a wick watering system. The combination of these factors means that a greenhouse incorporating this concept could be constructed at a remote location without water or heat, filled with water from a tank truck, and it would provide fresh fruit and vegetables on a year-round basis with minimum attention.

Another basic advantage relates to economics. In any enclosed growing unit, it is necessary to control temperature and humidity and, obviously, to construct an enclosure. The economic efficiency of a "greenhouse" depends directly upon the area of the growing surface, as it relates to these costs. In conventional greenhouses allowance must be made for walkways and service areas and the usable growing area is, therefore, approximately fifty percent of the enclosed surface area. Using my system, a much greater percentage of the enclosed surface area is devoted to productive growing. The plants are moved to the pickers, rather than the pickers moving to the plants. This offers obvious savings in labor and ease of handling the picked fruit.

An additional asset is that this system moves every growing plant through a complete 360° circle continuously during daylight hours so that each plant receives uniform exposure to the sun and there are no "hot spots" or shady areas to mar development of the fruit.

The system guarantees uniform control of exposure to natural sunlight. This control, coupled with the common controls of temperature and humidity, provides a regulated environment for plants.

The system is equally effective whether the plants are grown hydroponically or conventionally in soil.

DESCRIPTION OF THE PREFERRED EMBODIMENTS

Figure 1:
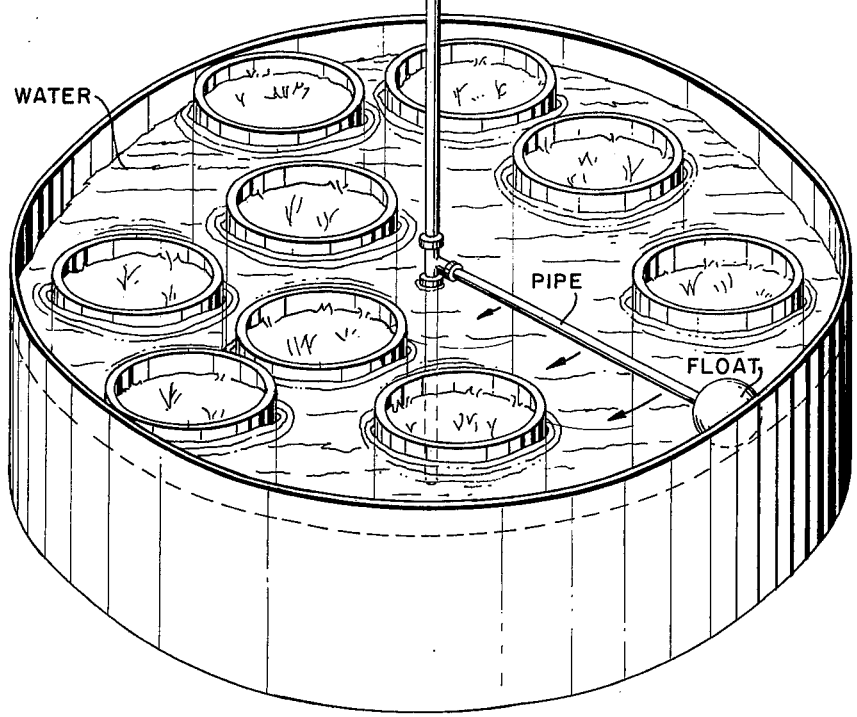
FIG. 1 is a general perspective view of the tank showing one type of container in which plants may be grown and one method of moving the containers.
Figure 4:
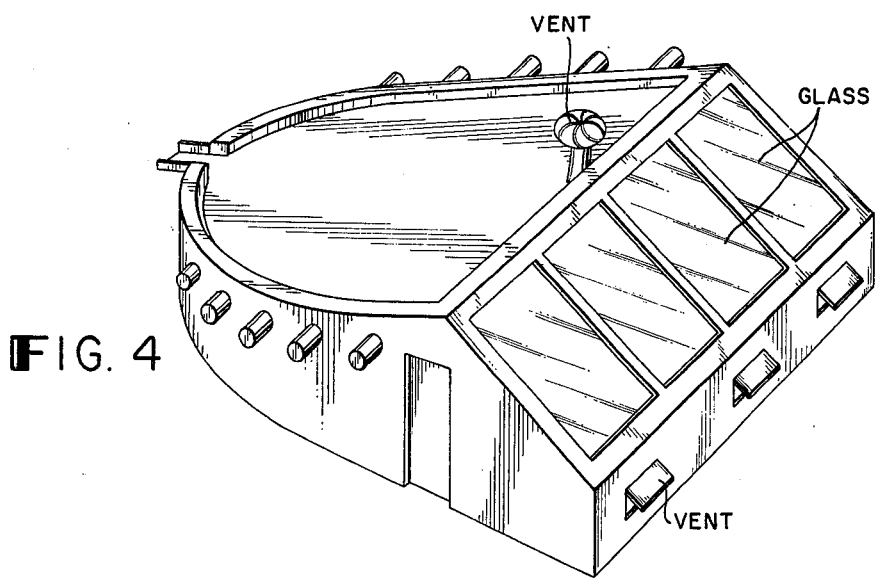
FIG. 4 is a general perspective view of one type enclosure for the system.
Figure 2:
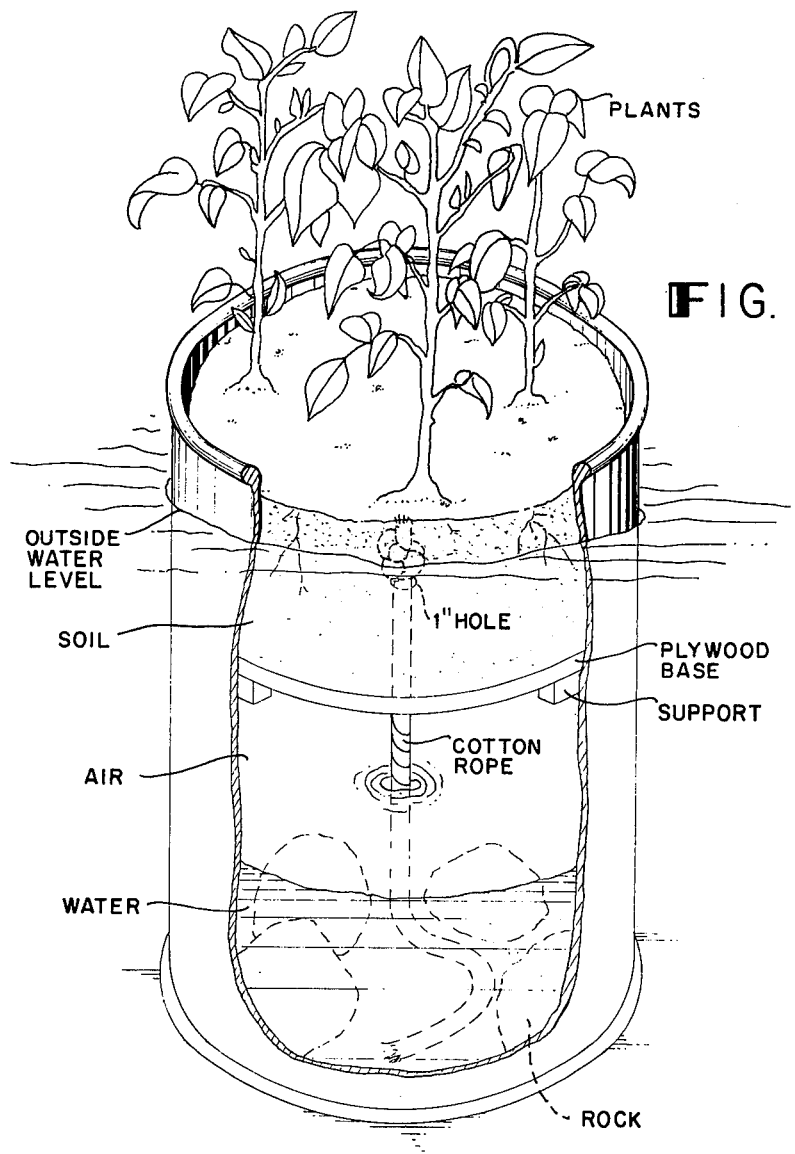
FIG. 2 is a detailed illustration of one type of container in which plants may be grown.
Figure 3:
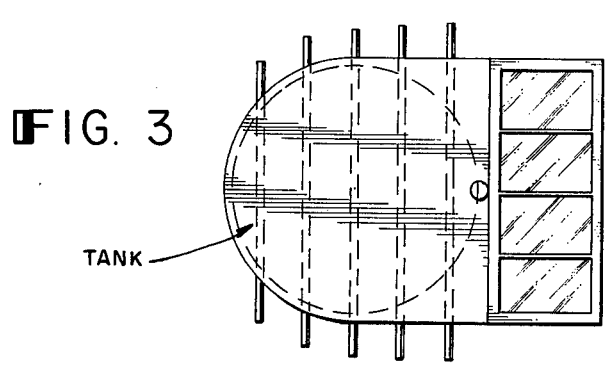
FIG. 3 is a top view of one type enclosure for the system.

FIGS. 1 through 4, depict a style of enclosure which may be constructed to house the system and a type of container in which plants may be grown. The nature of the enclosure is not critical. It may vary from a geodesic dome to the pueblo style which is shown. Nor is the effectiveness of the system dependent upon the method used to impart motion to the plants. The rotor may be moved by an electric motor or a water wheel or by a simple windmill or even manually. The rotor may be eliminated and the plants moved by creating a current in the pool of water upon which they float.

Similarly, the venting arrangement and solar heating system which are incorporated into the enclosure are not novel or new. They are simple modifications of similar applications currently in use in conventional greenhouses. The novelty of the concept is not dependent upon the size, depth or shape of the pool upon which the plants float nor does it depend upon floating the plants in barrels, trays or other containers.

The concept of floating the plants upon a pool of water to provide for thermal storage and mobility and moving the plants beneath a light source are the unique elements of the system.

The embodiments of the process in which an exclusive property or right is claimed are defined as follows:

1. A novel growing unit comprising a walled enclosure, a predetermined portion of said enclosure being transparent to solar light, a circular water tank within said enclosure adapted to absorb said light and thereby provide a heat sink, a plurality of plant containers floating on the surface of said tank, and means extending from the exterior of said enclosure to the tank surface and being adapted to move said containers through a 360° path, at least a portion of which exposes said containers to the solar light.

2. A growing unit as in claim 1, wherein said means to move said containers comprises a powered vertical member rotatably mounted substantially centrally in said tank, and having a laterally extending member attached thereto at a first end, there being a float attached to a second end of said lateral member, whereupon rotation of said vertical member urges said lateral member against said containers to move the same in said path.

3. A growing unit as in claim 2, wherein said vertical member is powered by connection thereof to a windmill.

4. A growing unit as in claim 2, wherein said vertical member is powered by connection thereof to a water wheel.

* * * * *